Dec. 3, 1929.  P. SORCE  1,738,458
BUMPER MECHANISM FOR MOTOR VEHICLES
Filed Oct. 2, 1928  4 Sheets-Sheet 2
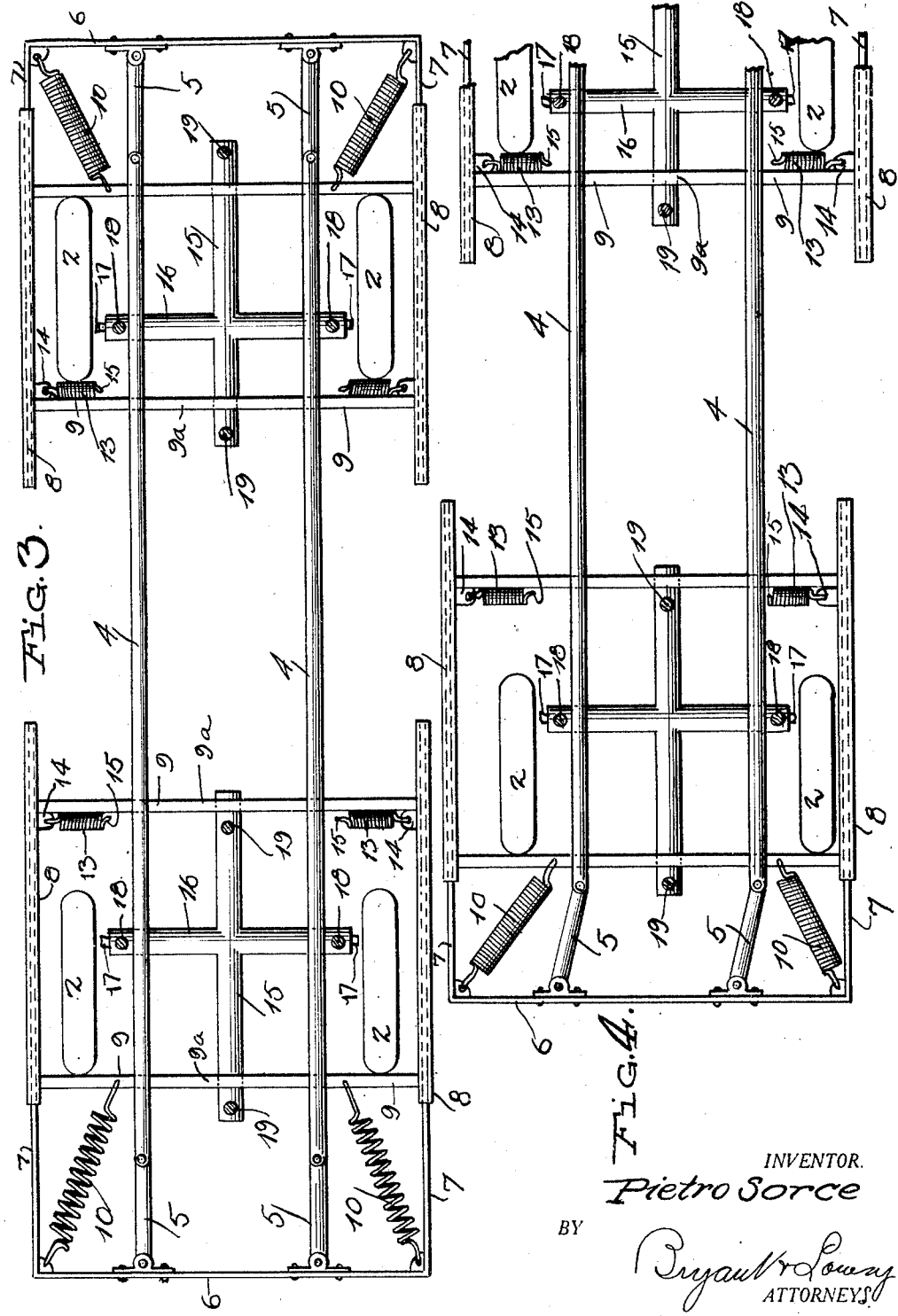
INVENTOR.
Pietro Sorce
BY
Bryant & Lowry
ATTORNEYS

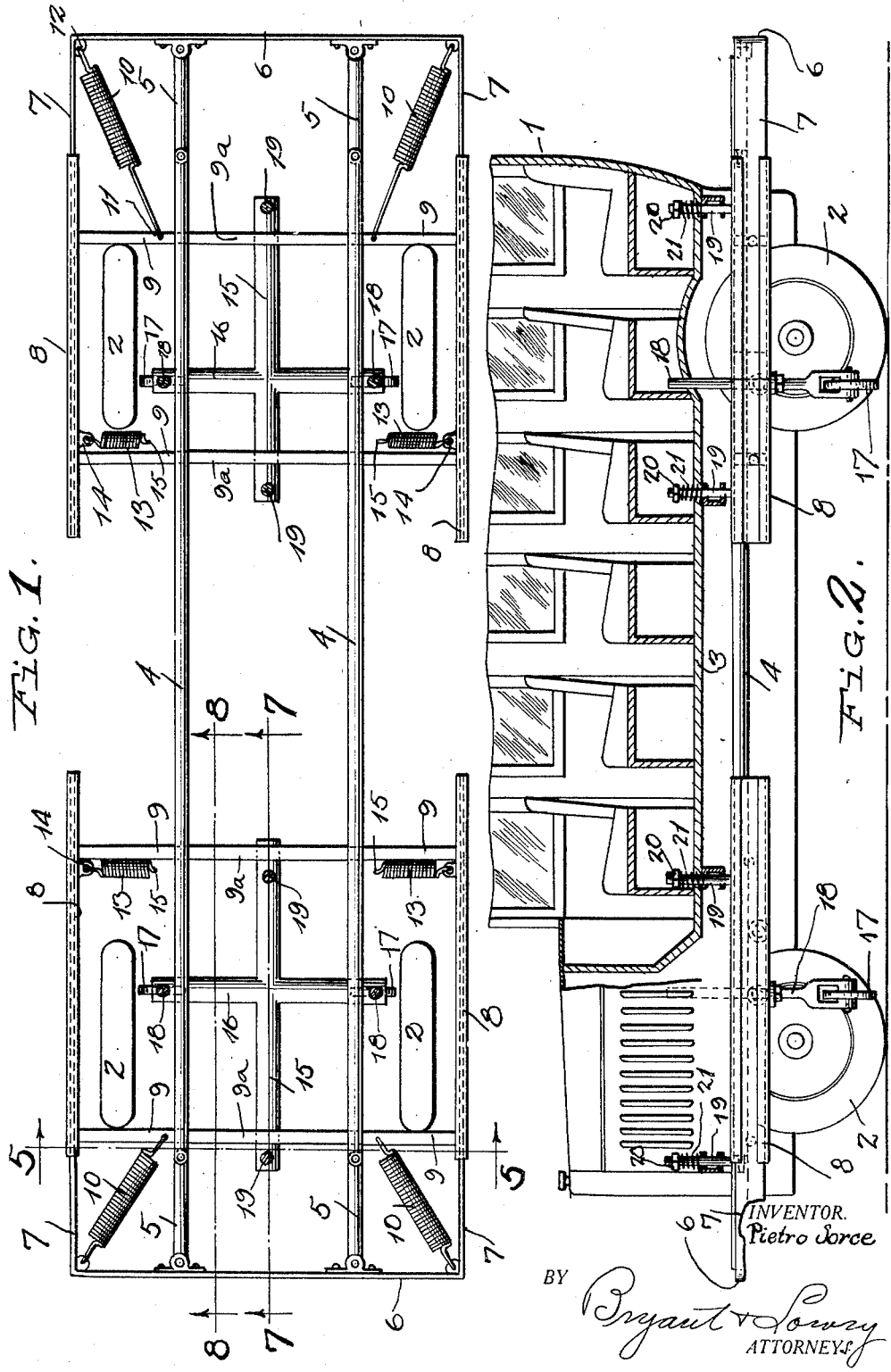

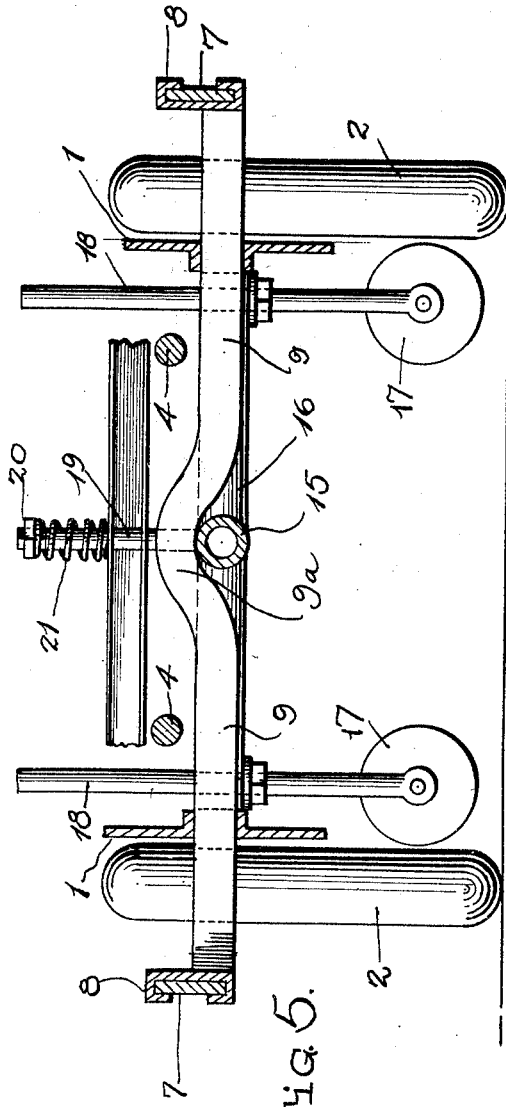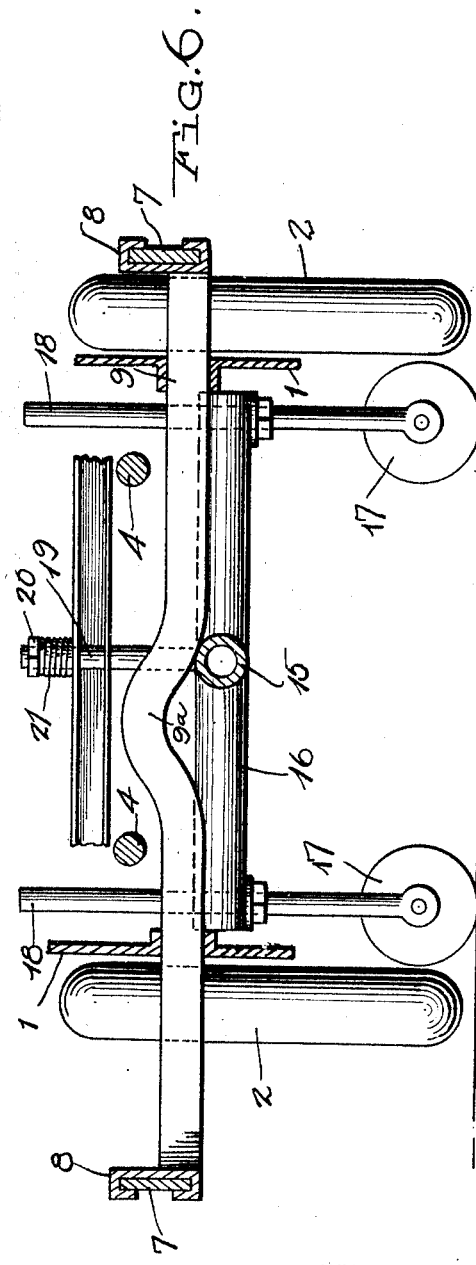

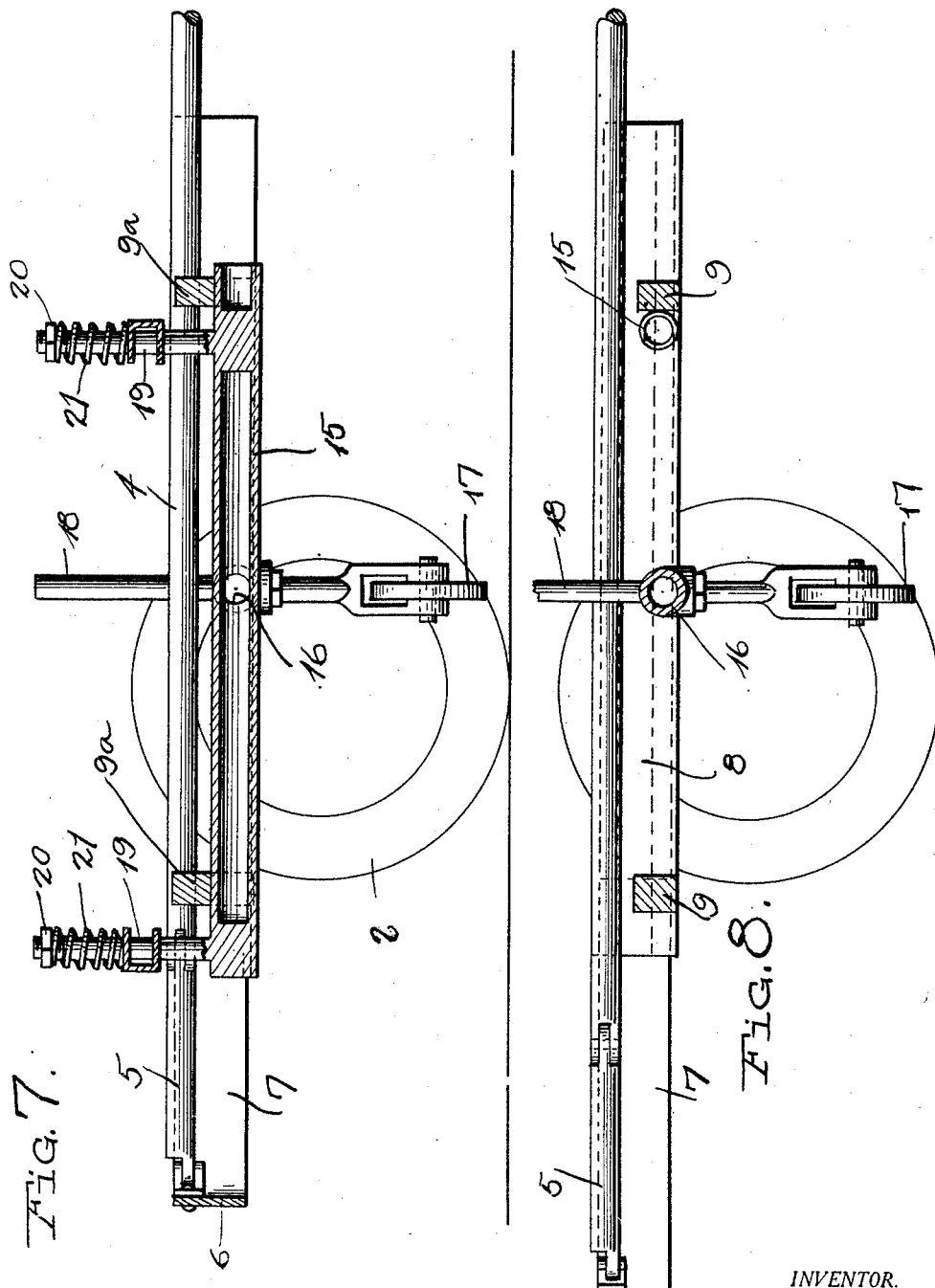

Patented Dec. 3, 1929

1,738,458

UNITED STATES PATENT OFFICE

PIETRO SORCE, OF ROCHESTER, NEW YORK

BUMPER MECHANISM FOR MOTOR VEHICLES

Application filed October 2, 1928. Serial No. 309,837.

This invention relates to certain new and useful improvements in bumper mechanism and while illustrated in connection with a motor vehicle of the bus type, it is to be understood that the same may be associated with motor vehicles of other types as well as street cars, railroad cars and trains and in any connection where bumpers or shock absorbing devices are used.

The primary object of the invention is to provide bumper mechanism for motor vehicles that is positioned both forwardly and rearwardly and at each side thereof with spring devices associated with bumper bars for the protection of the vehicle regardless of the direction of impact.

A further object of the invention is to provide bumper mechanism of the above type in which transversely extending traction wheels which are normally elevated above the road bed are adapted to be lowered simultaneously with lateral impact on the bumper mechanism for raising the adjacent ground wheels of the vehicle to permit lateral movement of the vehicle for eliminating serious injury thereto and any tilting or upsetting action.

With the above and other objects in view that will appear as the nature of the invention is better understood, the same consists in the novel combination, construction and arrangement of parts to be hereinafter more fully described and then claimed.

In the accompanying drawings which show the preferred embodiment of the invention:

Fig. 1 is a top plan view of the bumper mechanism for a motor vehicle showing the same in its normal position to be mounted upon a motor vehicle, Fig. 2 is the fragmentary side elevational view, partly in section, of a motor vehicle in the form of a bus equipped with the bumper mechanism shown in Fig. 1 with the auxiliary traction wheels normally elevated above the road bed, Fig. 3 is a top plan view, similar to Fig. 1 showing the bumper mechanism forwardly projected by a rear impact, Fig. 4 is fragmentary top plan view, similar to Fig. 3, showing the bumper mechanism laterally shifted, Fig. 5 is a cross sectional view taken on line 5—5 of Fig. 1 showing the auxiliary traction wheels elevated and the transversely extending cam bar for operating the auxiliary wheels, Fig. 6 is a cross sectional view, similar to Fig. 5 showing the cam bar laterally shifted and the auxiliary traction wheels lowered and the wheels of the motor vehicle elevated, Fig. 7 is a detail sectional view taken on line 7—7 of Fig. 1 showing the spring devices for holding the auxiliary wheels elevated, and Fig. 8 is a detail sectional view taken on line 8—8 of Fig. 1.

While the invention may be used in different arts where bumper mechanism or shock absorbers are utilized, the same is herein illustrated as associated with a motor vehicle 1 of the bus type as shown in Fig. 2 that comprises the usual chassis construction and ground wheels 2. The bumper mechanism is supported beneath and outwardly of the bottom wall 3 of the vehicle.

The bumper mechanism comprises a pair of longitudinally extending rods 4 running the entire length of the vehicle and having link connections 5 at the front and rear ends thereof with transversely extending bumper plates 6. The opposite end of each bumper plate 6 carries an inwardly directed right angularly extending side bumper plate 7 that slidably telescopes in a second side bumper plate 8 as clearly shown in Figs. 2, 5 and 6.

The side bumper plates 8 are supported, as illustrated in Figs. 5 and 6 by a pair of transversely extending cam bars 9, a pair of cam bars 9 being associated with each pair of oppositely arranged bumper plates 8 and slidably extending through bearings in the vehicle chassis or body, as diagrammatically illustrated in Figure 2. The longitudinally extending rods 4 are supported for sliding movements in suitable bearings on the vehicle chassis and said rods and end bumper plates 6 are longitudinally tensioned by the diagonally arranged coil springs 10 anchored at one end as at 11 to the adjacent cam bar 9 while the other end of each spring is anchored as at 12 to the outer end of the bumper plate 6. It will therefore be seen that impact on either of the bumper plates 6 at the front and rear ends of the motor vehicle will cause longitudinal shifting of the rods 4 and bumper plates with the force or shock of the impact absorbed by the springs 10 as illustrated in Fig. 3. Coil springs 13 are connected to the side bumper plates 8 at one of their ends as at 14 while the other ends 15 are secured to a convenient part of the motor vehicle 1. Lateral thrusts or impacts are absorbed by the coil springs 13 as indicated by the left hand side of Fig. 4, it being noted that during such lateral movement of the bumper mechanism that the links 5 connecting the rods 4 to the end bumper plates assume angular positions as illustrated.

Auxiliary traction wheels are associated with the bumper mechanism and while normally assuming positions elevated above the road bed, are automatically lowered during lateral shifting movements of the bumper mechanism to engage the ground and elevate the wheels of the motor vehicle, these relative positions being illustrated in Figs. 5 and 6.

The auxiliary wheels are carried by a cross shaped frame comprising a longitudinally extending leg 15 and a cross leg 16, the auxiliary wheels 17 being journalled at the lower ends of rods 18 that extend upwardly through the outer ends of the cross leg 16 and into suitable bearings in the bottom 3 of the vehicle, the auxiliary wheels 17 extending transversely of the vehicle and at right angles to the wheels 2. A rod 19 carried perpendicularly by each end of the frame leg 15 extends upwardly through the chassis of the vehicle as illustrated in Figs. 5 and 6 and is threaded at its upper end to receive a nut 20 threaded thereon to form an abutment for one end of the coil spring 21 inclosing the rod 19 while the other end of the spring abuts the chassis, the two springs 21 associated with each auxiliary wheel frame normally holding the frame and wheels 17 elevated as shown in Fig. 5. The cam bar 9 has an intermediate raised cam portion 9ª overlying the longitudinal leg 15 of the auxiliary frame that forms a recess or pocket to receive the frame leg and permit elevated positioning of the wheels 17. When the side bumper bars are laterally shifted as illustrated in Fig. 6, the two cam bars 9 move to the position shown in Fig. 6 for depressing the auxiliary frames against the tension of the springs 21 for lowering the auxiliary wheels 17 into ground contact and for raising the vehicle wheels 2 which will permit lateral bodily shifting movement of that end of the vehicle receiving the impact.

From the above detailed description of the invention it is believed that the construction and operation of the same will at once be apparent, it being noted that the bumper mechanism encloses the front and rear end of the vehicle and also opposite sides thereof adjacent the front and rear ground wheels of the vehicle. End thrusts on the end bumper plates are absorbed by the diagonally arranged coil springs 10 while lateral thrusts are absorbed by the transversely extending springs 13. During such lateral thrusts, the auxiliary transversely disposed wheels 17 are lowered into ground engagement and the adjacent vehicle wheels elevated so that the vehicle will be laterally shifted upon the auxiliary wheels and danger of the same upsetting eliminated.

While there is herein shown and described the preferred embodiment of the invention, it is to be understood that minor changes may be made therein, such as will fall in the scope of the invention as claimed.

What I claim as new is:

1. Bumper mechanism for motor vehicles comprising in combination with a motor vehicle, longitudinally tensioned rods, end bumper plates having linked connections with said rods, side bumper plates carried by the end bumper plates and spring connections between the side bumper plates and vehicle.

2. Bumper mechanism for motor vehicles comprising in combination with a motor vehicle, longitudinally tensioned rods, end bumper plates having linked connections with said rods, side bumper plates carried by the end bumper plates, spring connections between the side bumper plates and vehicle, transversely disposed auxiliary wheels normally disposed above the ground line and adjacent each pair of vehicle wheels and means for lowering the auxiliary wheels and raising the vehicle wheels during laterally shifting movement of the side bumper plates.

3. Bumper mechanism for motor vehicles comprising in combination with a motor vehicle, longitudinally tensioned rods, end bumper plates having linked connections with said rods, side bumper plates carried by the end bumper plates, spring connections between the side bumper plates and vehicle, transversely disposed auxiliary wheels normally disposed above the ground line and adjacent each pair of vehicle wheels, a pair of cam bars connecting each pair of side bumper plates and a vertically tensioned frame carrying the auxiliary wheels adapted to be lowered by the cam bars when the side bumper plates are laterally shifted.

4. Bumper mechanism for motor vehicles comprising in combination with a motor vehicle, longitudinally tensioned rods, end bumper plates having linked connections with said rods, side bumper plates carried by the end bumper plates, spring connections between the side bumper plates and vehicle, transversely disposed auxiliary wheels normally disposed above the ground line and adjacent each pair of vehicle wheels, a pair of cam bars connecting each pair of side bumper plates and a vertically tensioned frame carrying the auxiliary wheels adapted to be lowered by the cam bars when the side bumper plates are laterally shifted, said frame comprising a longitudinally extending leg disposed beneath the cam bars, and said cam bars each having an intermediate raised cam portion receiving the leg when the frame and auxiliary wheels are normally elevated.

5. Bumper mechanism for motor vehicles comprising in combination with a motor vehicle, longitudinally tensioned rods, end bumper plates having linked connections with said rods, inwardly extending sections on the end bumper plates, side bumper plates with which the end sections are telescopically associated, cross bars connecting the side bumper plates and spring connections between the side bumper plates and vehicle.

6. Bumper mechanism for motor vehicles comprising in combination with a motor vehicle, a frame supported beneath the vehicle chassis for vertical movement, normally elevated transversely disposed ground wheels on the frame, side bumper plates carried by transversely extending bars disposed above the frame, engaged therewith and slidable in bearings in the vehicle body, and said bar and frame cooperating to lower the frame and wheels carried thereby into ground contact upon inward movement of either bumper plate.

7. Bumper mechanism for motor vehicles comprising in combination with a motor vehicle, a frame supported beneath the vehicle chassis for vertical movement, normally elevated transversely disposed ground wheels on the frame, side bumper plates carried by transversely extending bars disposed above the frame, engaged therewith and slidable in bearings in the vehicle body, and a cam portion in the bar cooperating with the frame for lowering the wheels carried by the frame and raising the vehicle body upon inward movement of either bumper plate.

8. Bumper mechanism for motor vehicles comprising in combination with a motor vehicle, a normally elevated tensioned frame beneath the chassis having ground wheels adapted to be lowered into ground contact, side bumper plates and means connecting the bumper plates slidable through bearing openings in the vehicle and cooperating with the frame for raising the vehicle and lowering the frame upon inward movement of either of the bumper plates.

In testimony whereof I affix my signature.

PIETRO SORCE.